US006801542B1

(12) United States Patent
Subbiah

(10) Patent No.: US 6,801,542 B1
(45) Date of Patent: Oct. 5, 2004

(54) METHOD AND APPARATUS FOR PROVIDING AN INTERWORKING UNIT BETWEEN ATM NETWORKS AND IP NETWORKS

(75) Inventor: Baranitharan Subbiah, Sunnyvale, CA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/377,263

(22) Filed: Aug. 19, 1999

(51) Int. Cl.[7] .............................. H04J 3/16; H04J 3/22
(52) U.S. Cl. ..................... 370/467; 370/401; 370/395.1
(58) Field of Search ................................ 370/467, 465, 370/466, 469, 474, 535, 536, 537, 542, 401, 395.1, 395.5, 395.2, 395.51, 395.52, 352, 351, 310.1, 395.6, 410

(56) References Cited

U.S. PATENT DOCUMENTS

| 5,774,668 | A | * | 6/1998 | Choquier et al. | 370/480 |
|---|---|---|---|---|---|
| 6,041,054 | A | * | 3/2000 | Westberg | 370/389 |
| 6,266,343 | B1 | * | 7/2001 | Caves | 370/395.61 |
| 6,330,239 | B1 | * | 12/2001 | Suzuki | 370/395.1 |
| 6,366,961 | B1 | * | 4/2002 | Subbiah et al. | 370/352 |
| 6,385,195 | B2 | * | 5/2002 | Sicher et al. | 370/328 |
| 6,396,840 | B1 | * | 5/2002 | Rose et al. | 370/401 |
| 6,430,394 | B1 | * | 8/2002 | Boyden | 370/316 |
| 6,522,667 | B1 | * | 2/2003 | Oda et al. | 370/474 |
| 6,650,619 | B1 | * | 11/2003 | Schuster et al. | 370/230 |
| 2002/0078151 | A1 | * | 6/2002 | Wickam et al. | 709/204 |

FOREIGN PATENT DOCUMENTS

EP        0 841 831        5/1998

OTHER PUBLICATIONS

Suden M. et al., "*Gateway Based Approach for Conducting Multiparty Multimedia Sessions Over Heterogeneous Signaling Domains*," The IEEE Inform, IS Los Alamitos, CA IEEE Computer Soc., Apr. 7, 1997. pp. 701–710.

Hamdi M. et al., "Voice Service Interworking for PSTN and IP Networks," IEEE Comunications Magazine, US IEEE Service Center. Piscataway, NJ vol. 37, No. 5, May 1999, pp. 104–111.

Subbiah B. et al., "*User Multiplexing in RTP Payload Between IP Telephony Gateways*," Internet Draft Aug. 21, 1998.

Eneroth G. et al., "*Applying ATM/AAL2 as a Switching Technology in Third-Generation Mobile Access Networks*," IEEE Communications Magazine, US IEEE Service Center. Piscataway, NJ, vol. 37, No. 6, Jun. 1999, pp. 112–122.

* cited by examiner

*Primary Examiner*—Brian Nguyen
(74) *Attorney, Agent, or Firm*—Squire, Sanders & Dempsey L.L.P.

(57) ABSTRACT

A method and apparatus for providing an interworking unit between ATM networks and IP networks. A gateway unit is provided that will interconnect a ATM (AAL2) based access/ core network to an IP based (Mux in RTP). The gateway unit acts as an interface which is disposed between a first and second network, wherein the first network uses a first type of signaling and the second network uses a second type of signaling, and the interface translates signaling between the first and second networks. The interface further includes a control plane for translating signaling between the first and second network and/or a user plane for converting user data from the first type of signaling to the second type of signaling. The control plane maps services between the first and second networks and transfers the services between the first and second networks. The interface also includes at least one interface module and multiplexing module. The interface module includes a first type of interface module for providing connectivity to the first network and a second type of interface module for providing connectivity to the second network. The multiplexing modules includes a first type of multiplexing module for providing multiplexing and demultiplexing packets for the first type of signaling and a second type of multiplexing module for multiplexing and demultiplexing packets for the second type of signaling.

26 Claims, 7 Drawing Sheets

METHOD AND APPARATUS FOR PROVIDING AN INTERWORKING UNIT BETWEEN ATM NETWORKS AND IP NETWORKS

BACKGROUND OF THE INVENTION

1. Field of the Invention.

This invention relates in general to telecommunications, and more particularly to a method and apparatus for providing an interworking unit between ATM networks and IP networks.

2. Description of Related Art.

Today's wireless systems are inefficient at handling small, frequent data calls and bursty IP traffic and therefor present a challenge in implementing high-speed data services. Existing circuit-switched connections will require more time slots as the number of data users increases. Yet the network and radio capacity required to support such large amounts of bursty traffic would make it uneconomic or impossible to implement.

Third Generation mobile phone networks are an evolutionary step up from today's Second Generation digital mobile systems. Whereas popular second generation, such as GSM, phones are optimized for voice communication, Third Generation smart phones and communicators will be able to transmit and receive a combination of digital information including speech, pictures, video and various kinds of information content. These technologies will provide users with a personal, mobile, multi-media communications service.

High data traffic, in particular IP traffic, is expected with these advanced services. To accommodate the high traffic demand, a number of factors must be considered in choosing a transport protocol, such as: bandwidth efficiency; quality of service (QoS); speech delay-sensitivity; standardization stability and permitted maximum number of concurrent users. ATM and IP switches are the only two protocols available on the market today.

The new ATM adaptation layer 2 (AAL2) standard is an International Telecommunications Union—Telecommunications Standardization Sector (ITU-T) standard setting forth a multiplexing scheme in ATM for transporting compressed speech. Accordingly, AAL2 and ATM may be used in implementing the next generation (3G or TGN) cellular access network systems. In an AAL2 based RAN, AAL2 signaling is used for setting up an AAL2 connection from a BS to RNC and RNC to MSC. ITU-T is currently involved in specifying the AAL2 signaling protocol which should be completed very soon. Speech signals received at the BS from a mobile terminal are converted as AAL2 packets and transported in the ATM networks. Since, speech packets are rather small (average of 10 bytes), they are multiplexed with packets from other users in one or more ATM cells in order to attain the maximum bandwidth efficiency. The growth of data applications in a cellular network has necessitated the need for an efficient transport application that is capable of supporting voice, data and video. At present, ATM is the only technology that is capable of offering QoS guarantee to the users for integrated voice, data and video. Based on the stringent requirement for QoS in cellular networks, many network equipment vendors are implementing AAL2 based RAN.

However, rapid growth of IP based applications has given impetus to an IP based cellular access networks. A new multiplexing method in IP, called User Multiplexing in a Real Time Protocol (RTP) Payload Between IP Telephony Gateways, is emerging as an alternative to the AAL2 to transport mobile telephony in the Radio Access Network (RAN) in 3rd Generation cellular network system. This method is disclosed in an Internet Draft entitled "User Multiplexing in RTP Payload Between IP Telephony Gateways." The method, hereinafter referred to as RTP multiplexing or RTP mux, calls for the multiplexing of a number of speech packets using a two byte mini-header which identifies the user associated with a packet. This mini-header thus allows packets from different users to be assembled into an RTP payload thereby reducing the overhead of RTP/UDP/IP headers.

Another reason for anticipation of IP based cellular access networks is due to QoS integration effort in IP. There are several proposals on how to integrate QoS in IP network being discussed in the Internet Engineering Tack Force (IETF) and industry forums. Proposals such as Diff-serv and MPLS are geared towards integrating QoS provisioning in IP networks. Considering that IP based applications will dominate in cellular networks in near future and data traffic will overtake the voice traffic, an IP based cellular access network is foreseen in near future.

Further more, IP telephony has emerged as a contender to the traditional telecom carriers to provide cost effective solution to long distance telephone calls. The H.323 family of standards that include H.225 and H.245 have given impetus to widespread deployment of IP telephony gateways in Intranets. Session Initiation Protocol (SIP), an IETF standard, also been used for IP telephony applications. These standards allow a call request from System Signaling 7 (SS7) based network is carried within the IP network between IP telephony gateways.

Accordingly, QoS integration in IP networks will enable the real time applications to share the transport medium with best effort data of Internet. Since IP is a natural choice for carrying variable size packets and only a small percentage of traffic would require real time guarantee, it can be easily seen that IP based transport will be the protocol of choice for network operators.

However, both AAL2 and IP protocols have advantages and disadvantages. IP switches and routers are ubiquitous and are the preferred solution as a result of bandwidth efficiency. Nevertheless, the new ATM adaptation layer 2 (AAL2) standard now means that ATM switches can be optimized for delay-sensitive speech and packet data services. Further complicating the problem is the promotion by infrastructure vendors of whatever solution they have available. Thus, future Radio Access Networks(RAN) and Core Networks (CN) could be based on ATM and/or IP. Yet, because the signaling of ATM networks and IP networks is different, these two networks cannot be interconnected.

It can be seen then that there is a need for a gateway unit that will interconnect a ATM (AAL2) based access/core network to an IP based (Mux in RTP) access/core network.

SUMMARY OF THE INVENTION

To overcome the limitations in the prior art described above, and to overcome other limitations that will become apparent upon reading and understanding the present specification, the present invention discloses a method and apparatus for providing an interworking unit between ATM networks and IP networks.

The present invention solves the above-described problems by providing a gateway unit that will interconnect a ATM (AAL2) based access/core network to an IP based (Mux in RTP) network.

A system in accordance with the principles of the present invention includes an interface disposed between a first and second network, wherein the first network uses a first type of signaling and the second network uses a second type of signaling, the interface translating signaling between the first and second networks.

Other embodiments of a system in accordance with the principles of the invention may include alternative or optional additional aspects. One such aspect of the present invention is that the first network in an ATM network.

Another aspect of the present invention is that the second network is an IP network.

Another aspect of the present invention is that the first network uses AAL2 signaling.

Another aspect of the present invention is that the interface further includes a control plane for translating signaling between the first and second network.

Another aspect of the present invention is that the interface further includes a user plane for converting user data from the first type of signaling to the second type of signaling.

Another aspect of the present invention is that the control plane maps services between the first and second networks and transfers the services between the first and second networks.

Another aspect of the present invention is that the interface includes at least one interface module and multiplexing module.

Another aspect of the present invention is that the interface module includes a first type of interface module for providing connectivity to the first network and a second type of interface module for providing connectivity to the second network.

Another aspect of the present invention is that the multiplexing modules include a first type of multiplexing module for providing multiplexing and demultiplexing packets for the first type of signaling and a second type of multiplexing module for multiplexing and demultiplexing packets for the second type of signaling.

Another embodiment of the invention includes a method for interfacing between a first and second network, wherein the method includes using a first type of signaling at a first network, using a second type of signaling at a second network and translating signaling between the first and second networks.

Another embodiment of the invention includes a method for providing messaging between a network of a first type and a network of a second type, wherein the method includes setting up a connection between the network of the first type and the network of the second type using an interworking unit; and releasing the connection between the network of the first type and the network of the second type using an interworking unit.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout.

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides a method and apparatus for interfacing between ATM and IP networks. An interworking unit (IWU) is provided between an IP based network and AAL2 (ATM) based networks for transporting mobile telephony. The interworking unit or gateway enables users connected between AAL2 (ATM) and RTP multiplexed IP to interwork without any problem. The gateway unit performs the necessary control and user plane protocol conversion between the two different (IP and AAL2 ) transport technologies at the network boundaries. Accordingly, the present invention enables a smooth transition from an AAL2 (ATM) based access/core network to an IP based access/core network and facilitate products of one type to interwork with the other type of product which may be deployed.

For example, future Radio Access Networks (RAN) and Core Networks (CN) could be based on ATM and/or IP. In an ATM based network, AAL2 will be used to carry the compressed speech; while in IP based network, an RTP multiplexing method will be used for the same purpose. It is very likely that both types of network will co-exist in the immediate future. In such scenario, a telephone call generated from the IP network (using RTP mux) needs to carried over AAL2 based network and vice versa. There are many scenarios where there is a need for such IWU so that the two competing transport technologies can interwork smoothly.

Figure 1:
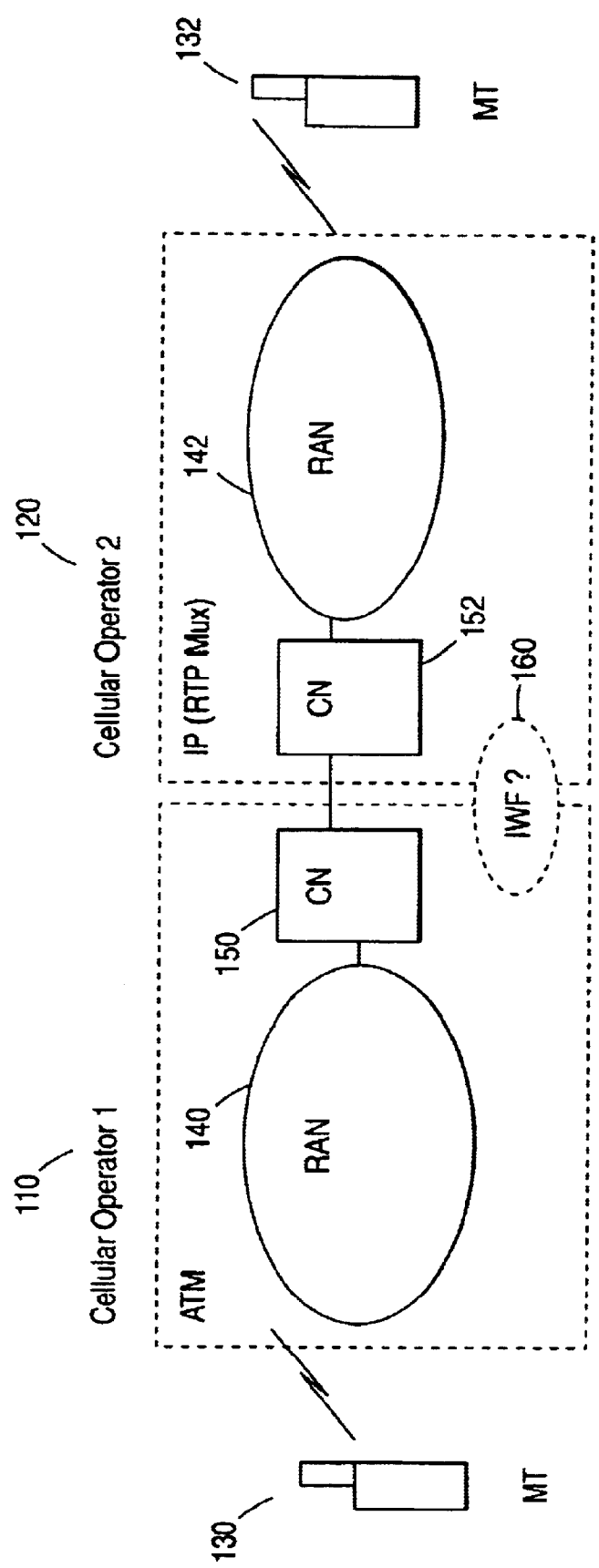
FIG. 1 illustrates an ATM based cellular network connected to an IP based cellular network.

FIG. 1 illustrates an ATM based cellular network 110 connected to an IP based cellular network 120. In FIG. 1, a first mobile user 130 is using an ATM based cellular network 110. A second mobile user 132 is using an IP based cellular network 120. Both the ATM based network 110 and the IP based network 120 include a RAN 140/142 and a CN 150/152. Because the network 120 of the second user 132 is based on a different transport technology than the network 110 of the first user 130, there is a need for an IWF 160 at the network boundary between the two cellular operators to allow the first mobile user 130 to connect with the second mobile user 132.

Figure 2:
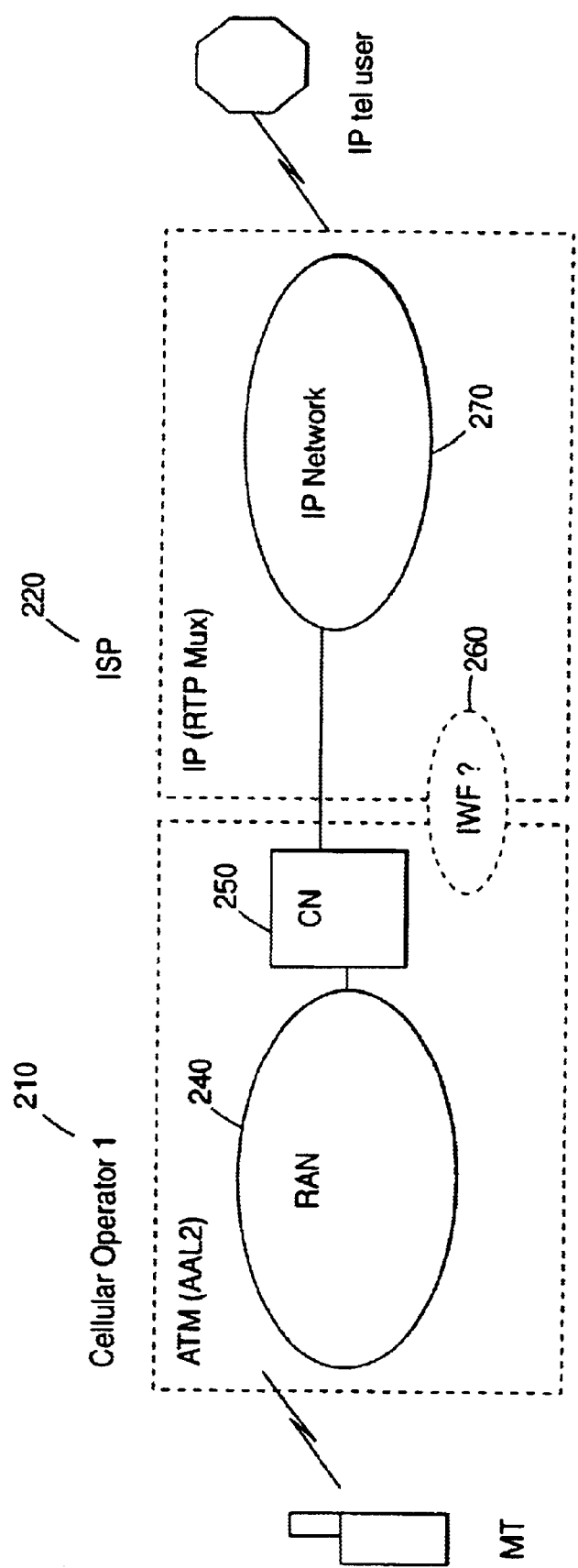
FIG. 2 illustrates an ATM based cellular network including both a RAN and a CN connected to IP based network that is based on IP telephony standards.

FIG. 2 illustrates an ATM based cellular network 210 including both a RAN 240 and a CN 250 connected to Internet Service Provider 220 providing access to an IP based network 270 that is based on IP telephony standards. This scenario is very significant due to wide deployment of IP telephony in IP networks 270. Again, there is a need for an IWU 260 at the edge of the networks so that messages related to a mobile call generated from an ATM based network 210 is converted appropriately to match the requirement of the IP based network 270.

Figure 3:
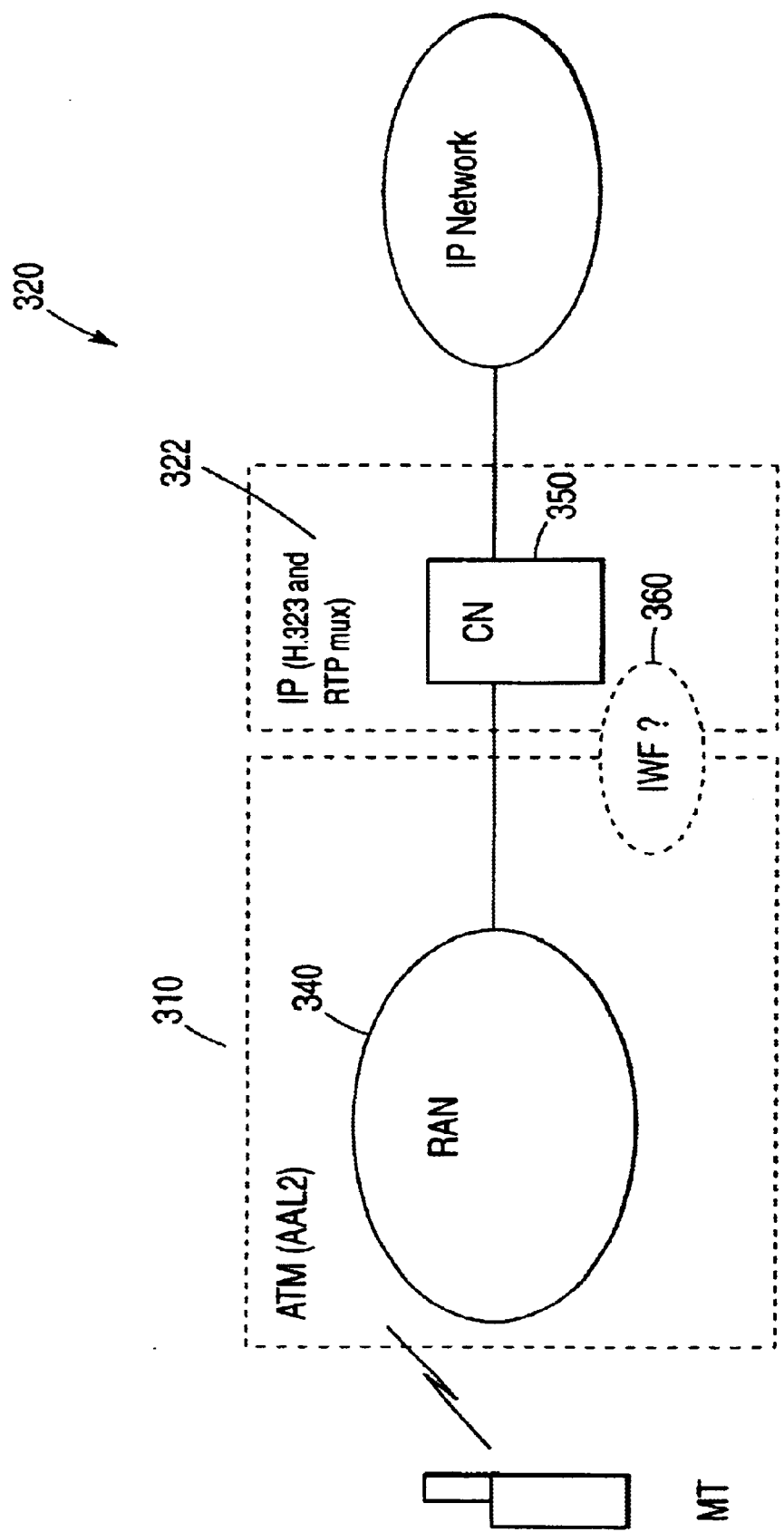
FIG. 3 illustrates an ATM based RAN connected to an IP based CN.

FIG. 3 illustrates an ATM based RAN 310 connected to an IP based CN 320. The IP based CN 320 uses RTP mux and H.323 signaling 322. This scenario is significant because it represents the expected invasion of IP into mobile networks. ATM with QoS guarantee is seen as an ideal solution for RAN 340 because the RAN 340 controls the radio resources. However, IP is seen as an option in the CN 350 because of the increase interconnectivity to IP networks. Again, there is a need for an IWU 360 at the edge of the networks so that messages related to a mobile call generated from an ATM based network 310 is converted appropriately to match the requirement of the IP based network 370.

From the scenarios illustrated in FIGS. 1–3, it can be seen that there is a need for a gateway unit to convert control messages and user data received from one type to network to other network and vice versa. The gateway unit needs to support both control plane (signaling) and user plane (data) interworking functionality.

Figure 4:
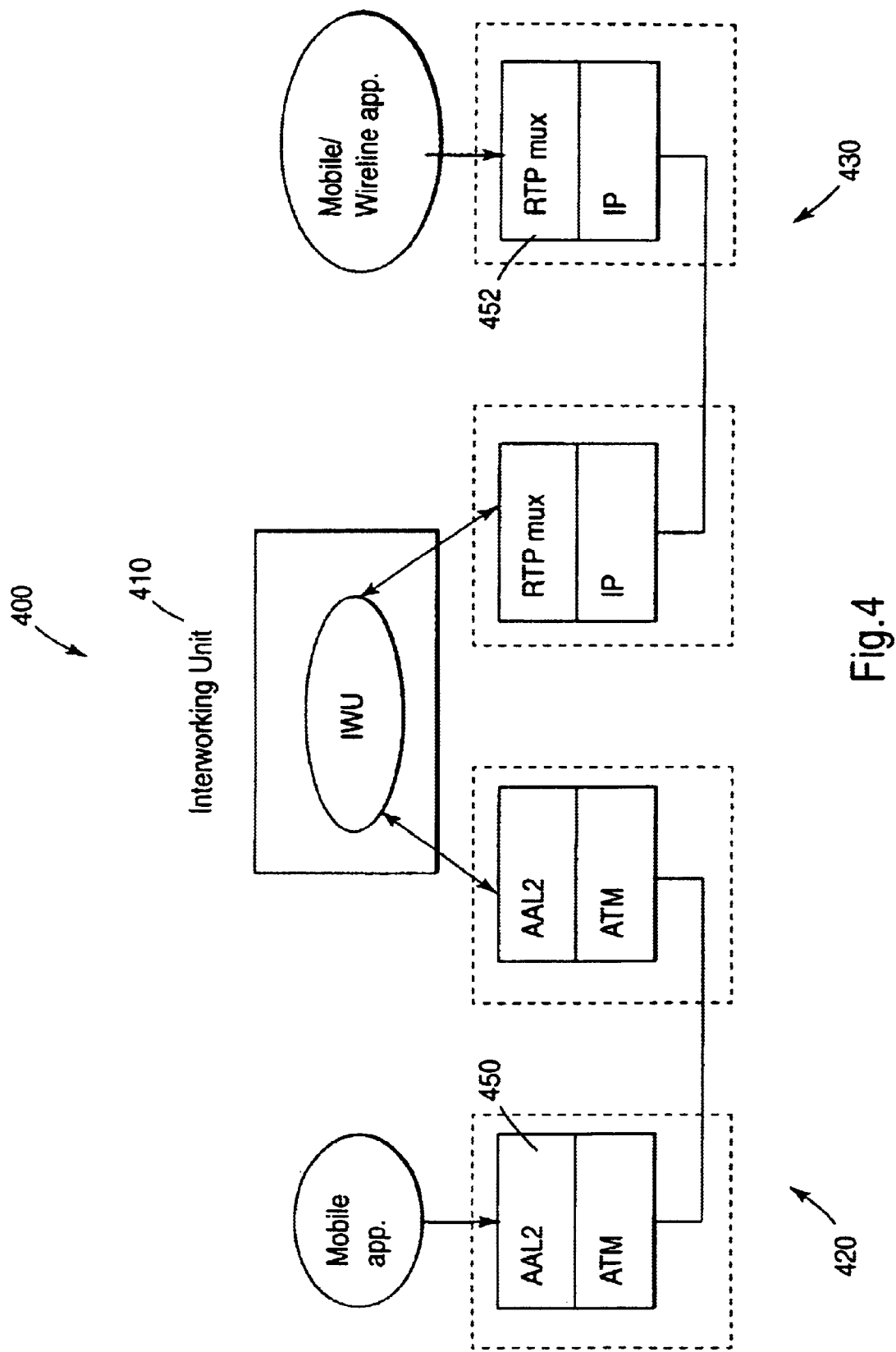
FIG. 4 illustrates a layered model for an interworking unit according to the present invention.

FIG. 4 illustrates a layered model 400 for an interworking unit 410 according to the present invention. In order to solve the interworking problem, the gateway unit 410 is capable of transferring both control and user plane information between ATM (AAL2) based network 420 and IP based network 430. The interworking unit 410 converts control messages and user data received from the ATM network 420 to the IP network 430 and from the IP network 430 to the ATM network 420. Note that the ATM network is using AAL2 signaling 450 and the IP network 430 is using RTP multiplexing 452.

Figure 5:
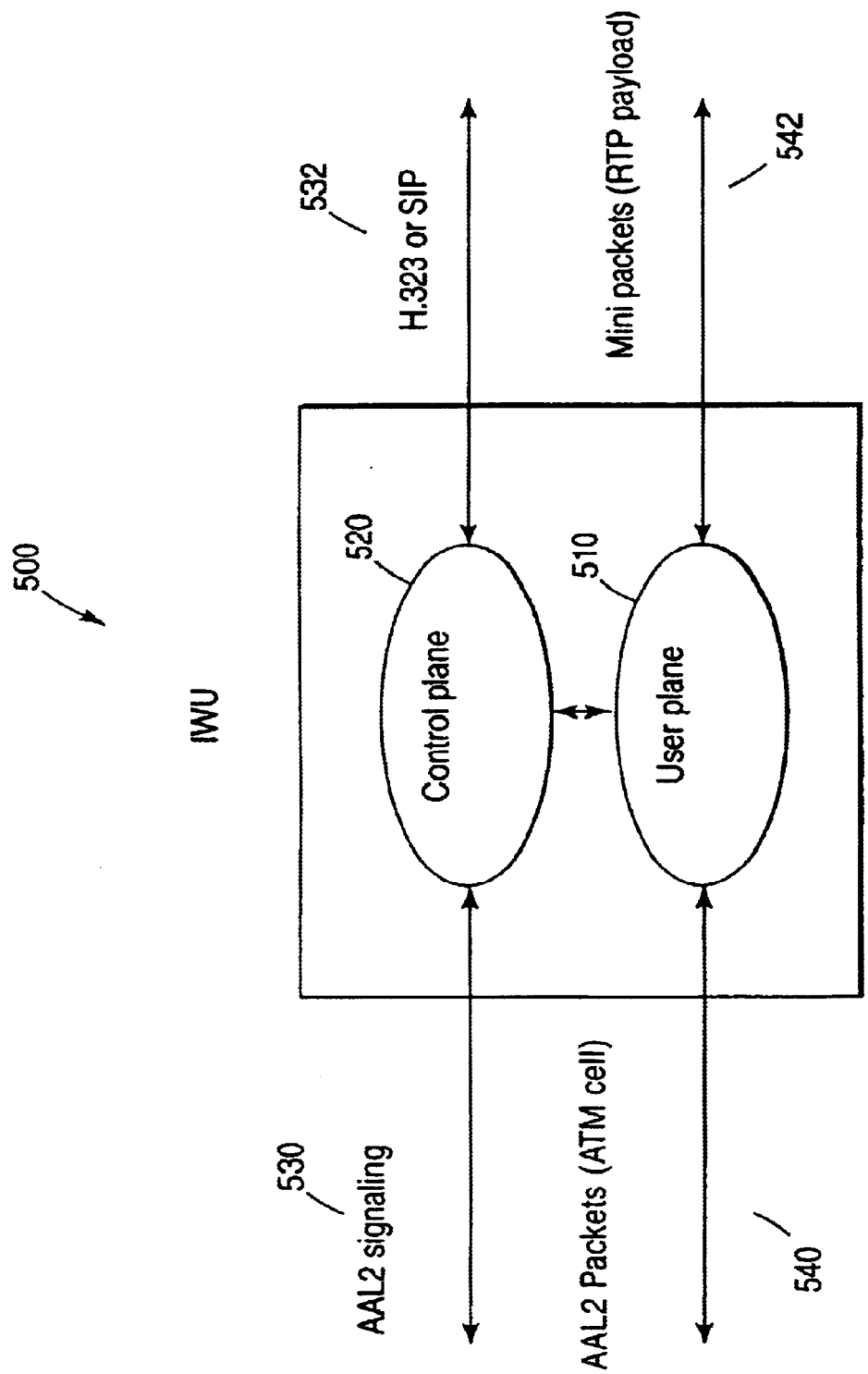
FIG. 5 illustrates the functionality of a gateway according to the present invention.

FIG. 5 illustrates the functionality of a gateway 500 according to the present invention. The two primary functions of the gateway unit are user plane 510 and control plane 520 interworking. In the control plane interworking function 520, the gateway unit 500 is responsible for converting AAL2 signaling messages 530 to H.323 or SIP messages 532 and vice versa. Translation from one form of signaling message into other form requires knowledge service mapping across two different control planes. For example, indication of call waiting from one network has to be converted to an appropriate call waiting message that the receiving network understands. The gateway unit 500 is responsible for mapping these services and transferring any transparent services between the two different signaling planes.

In the user plane interworking function 510, the gateway unit 500 is responsible for converting user data from one payload format into another payload format. For example, in an ATM network speech frames are in the form of AAL2 packets packed inside an ATM cell 540, whereas in an IP network speech frames are packed inside an RTP packet 540. After receiving a payload, the IWU unit 500 has to convert the speech frames to another format. User plane interworking 510 is much simpler when compared to the control plane interworking. For example, speech packet encapsulated within an ATM cell is simply removed and assembled into a RTP payload in the RTP multiplexing method.

Figure 6:
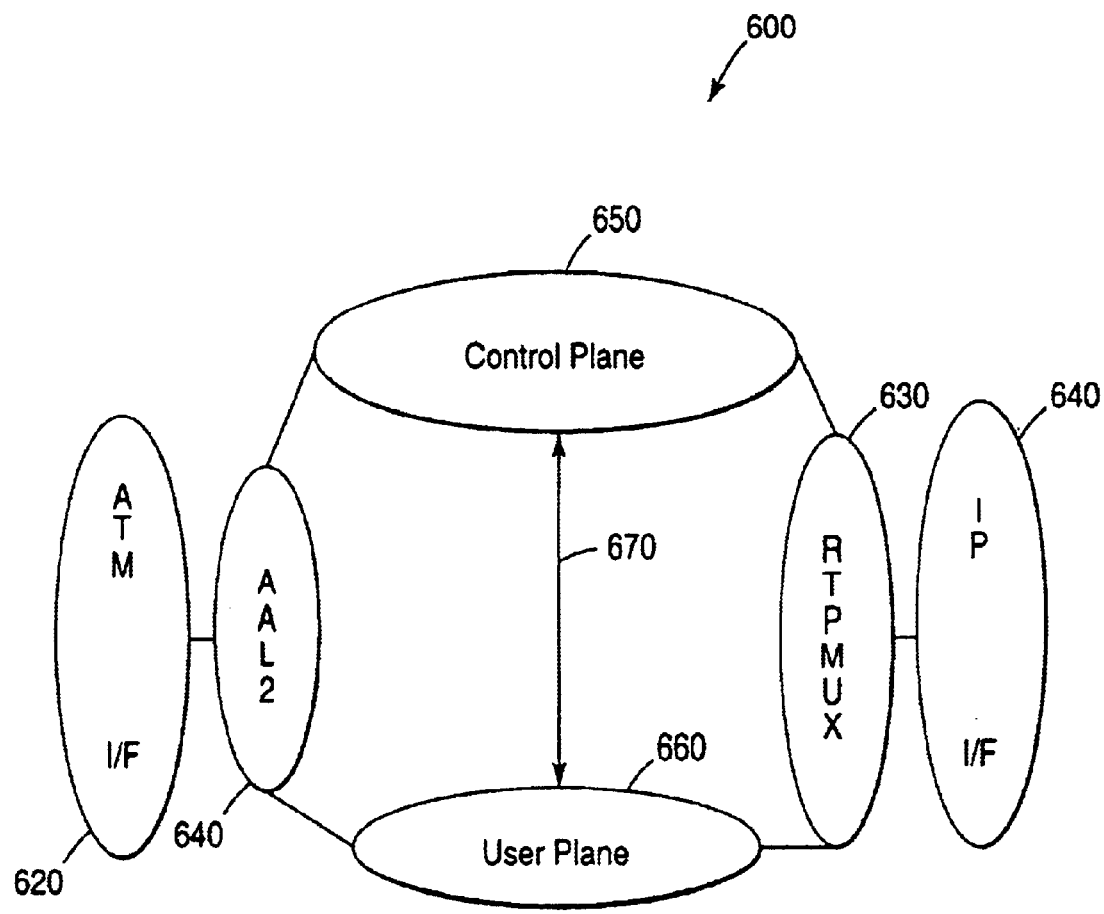
FIG. 6 illustrates gateway modules according to the present invention.

FIG. 6 illustrates modules for a gateway 600 according to the present invention. In FIG. 6, the gateway unit 600 includes a number of modules to provide smooth interworking between AAL2 and RTP multiplexing schemes. The modules include at least one IP interface 610, at least one ATM interface 620, at least one RTP multiplexing and demultiplexing module 630, at least one AAL2 multiplexing and demultiplexing module 640, a control unit 650, and a user plane unit 660. As shown in FIG. 6, IP 610 and ATM 620 interface modules allows connectivity to other network elements, whereas AAL2 640 and RTP 630 modules are involved in both multiplexing and demultiplexing functions. The control module 650 is responsible for transferring control plane information from one end to another end. Another function of the control unit 650 is to keep track of the user mapping across two different interfaces 670.

Figure 7:
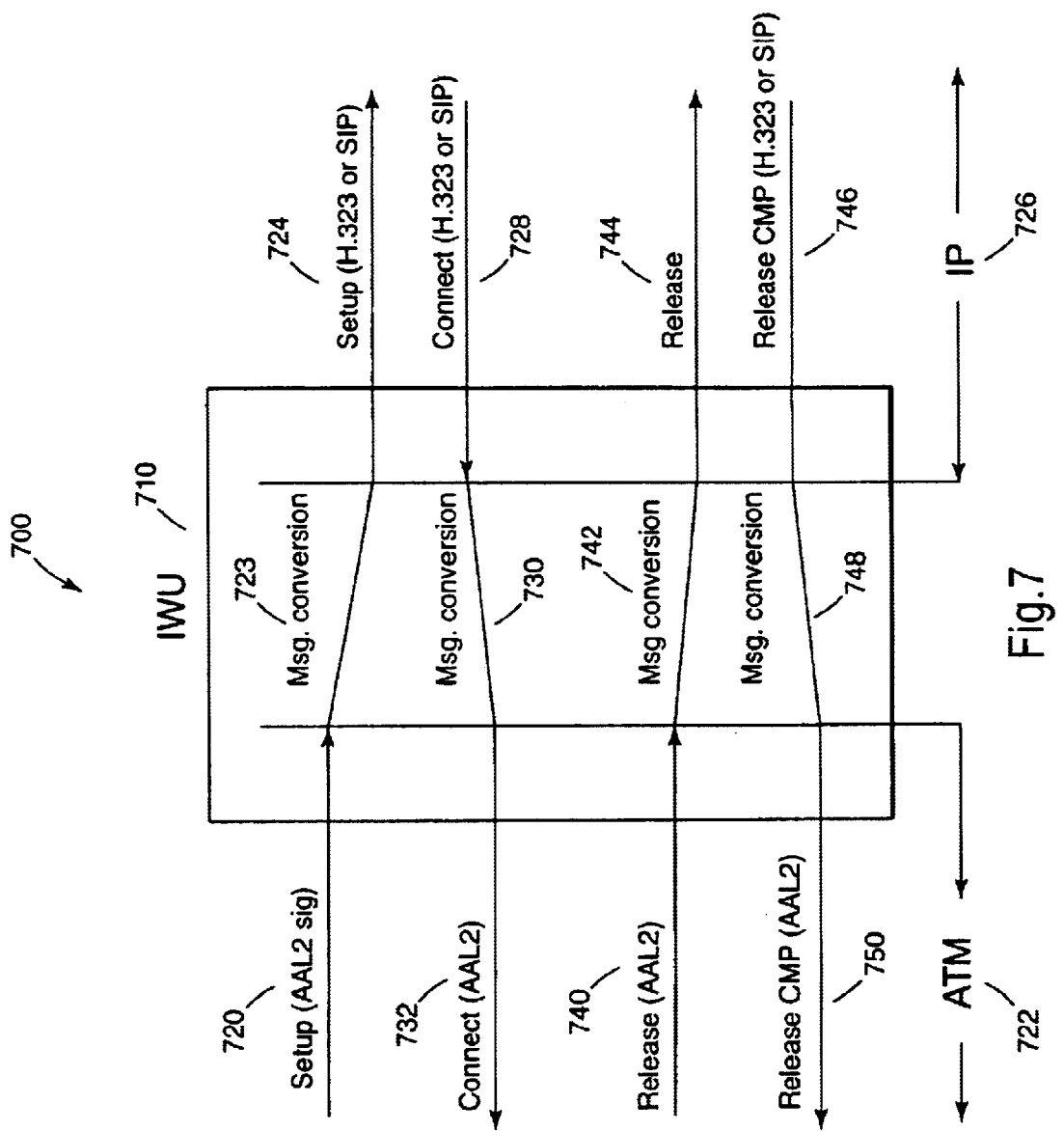
FIG. 7 illustrates a message sequence chart depicting the sequence of control plane message sequence at the interworking unit.

FIG. 7 illustrates a message sequence chart 700 depicting the sequence of control plane message sequence at the interworking unit 710. First a setup message 720 is sent to the interworking unit 710 from the ATM network 722. The interworking unit 710 converts 723 this message and sends a H.323 or SIP setup message 724 to the IP network 720. The IP network 726 sends a H.323 or SIP connect message 728 to the interworking unit 710. The interworking unit 710 converts 730 this message to an AAL2 connect message 732. A release AAL2 message 740 is sent to the interworking unit 710. The interworking unit 710 converts 742 the AAL2 release message to an IP release message 744. A release CMP message 746 is sent from the IP network 726 to the interworking unit 710. The interworking unit 710 converts 748 the IP network's release CMP message 742 to an AAL2 release CMP message 750, which is then sent to the ATM network 722. This sequence is the same regardless of the interworking unit deployment as described with reference to FIGS. 1–3.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. An interface disposed between a first network and a second network, wherein the first network uses a first type of signaling and the second network uses a second type of signaling, the interface translating signaling between the first network and the second network, the interface further comprising a control plane for translating signaling between the first network and the second network and a user plane for converting user data from the first type of signaling to the second type of signaling;

said control plane is configured to determine control parameters for conducting said first type of signaling on said first network when conducting a communication transaction on said first network; and said control plane is configured to use knowledge service mapping to translate said control parameters for conducting said communication transaction on the first network to the second network when the control plane translates signaling between the first network and the second network, wherein the interface further comprises a control plane for mapping services between the first network and the second network and transferring the services between the first network and the second network.

2. The interface of claim 1 wherein the first network is an ATM network.

3. The interface of claim 2 wherein the second network is an IP network.

4. The interface of claim 3 wherein the first network uses AAL2 signaling.

5. The interface of claim 1 wherein the first type of signaling is AAL2 packets and the second type of signaling is IP packets.

6. The interface of claim 1 wherein the first type of signaling is IP packets and the second type of signaling is IP packets.

7. The interface of claim 1 wherein the interface comprises at least one interface module and at least one multiplexing module.

8. The interface of claim 1 wherein the interface module comprises a first type of interface module for providing connectivity to the first network and a second type of interface module for providing connectivity to the second network.

9. The interface of claim 8 wherein the multiplexing modules comprise a first type of multiplexing module for providing multiplexing and demultiplexing packets for the first type of signaling and a second type of multiplexing module for multiplexing and demultiplexing packets for the second type of signaling.

10. The interface of claim 7 wherein the multiplexing modules comprise a first type of multiplexing module for providing multiplexing and demultiplexing packets for the first type of signaling and a second type of multiplexing module for multiplexing and demultiplexing packets for the second type of signaling.

11. A method of interfacing between a first and second network, comprising:

using a first type of signaling at a first network;

using a second type of signaling at a second network;

translating control signals between the first network and the second network; and converting user data from the first type of signaling to the second type of signaling;

determining control parameters for conducting said first type of signaling on said first network when conducting a communication transaction on said first network; and translating said control parameters using knowledge service mapping for conducting said communication transaction on the first network to the second network when a control plane translates signaling between the first network and the second network, wherein the step of translating further comprises mapping services between the first network and the second network and transferring the services between the first network and the second network.

12. The method of claim 11 wherein the first network is an ATM network.

13. The method of claim 12 wherein the second network is an IP network.

14. The method of claim 13 wherein the first type of signaling in the first network comprises AAL2 signaling.

15. The method of claim 11 wherein the first type of signaling is AAL2 packets and the second type of signaling is IP packets.

16. The method of claim 11 wherein the first type of signaling is IP packets and the second type of signaling is IP packets.

17. The method of claim 11 wherein the translating further comprises providing connectivity to the first network and to the second network.

18. The method of claim 17 wherein the translating further comprises multiplexing and demultiplexing packets for the first type of signaling and multiplexing and demultiplexing packets for the second type of signaling.

19. The method of claim 11 wherein the translating further comprises multiplexing and demultiplexing packets for the first type of signaling and multiplexing and demultiplexing packets for the second type of signaling.

20. A method for providing messaging between a network of a first type and a network of a second type, comprising:

setting up a connection between the network of the first type and the network of the second type using an interworking unit;

releasing the connection between the network of the first type and the network of the second type using the interworking unit;

determining control parameters for conducting a first type of signaling on said network of the first type for conducting a communication transaction on said network of the second type; and translating said control parameters using knowledge service mapping for conducting said communication transaction on said network of the first type to network of the second type when a control plane translates signaling between the network of the first type and the network of the second type, wherein the step of translating further comprises mapping services between the network of the first type and the network of the second type and transferring the services between the network of the first type and the network of the second type.

21. The method of claim 20 wherein the setting up a connection further comprises:

sending a setup message from the network of the first type to the interworking unit;

converting, using the knowledge service mapping, the setup message to signaling of the network of the second type, sending the converted setup message to the network of the second type;

sending a connect message from the network of the second type to the interworking unit; and converting the connect message to signaling of the network of the first type; and sending the converted connect message to the network of the first type.

22. The method of claim 21 wherein the releasing the connection further comprises:

sending a release message from the network of the first type to the interworking unit;

converting, using the knowledge service mapping, the release message to signaling of the network of the second type;

sending the converted release message to the network of the second type;

sending a release control message protocol message from the network of the second type to the interworking unit;

converting the release control message protocol message to signaling of the network of the first type; and sending the converted release control message protocol message to the network of the first type.

23. The method of claim 20 wherein the releasing the connection further comprises:

sending a release message from the network of the first type to the interworking unit;

converting, using the knowledge service mapping, the release message to signaling of the network of the second type, sending the converted release message to the network of the second type.

sending a release control message protocol message from the network of the second type to the interworking unit;

converting the release control message protocol message to signaling to the network of the first type; and sending the converted release control message protocol message to the network of the first type.

24. The method of claim 20 wherein the first network is an ATM network.

25. The method of claim 24 wherein the second network is an IP network.

26. The method of claim 25 wherein the first type of signaling in the network of the first type comprises AAL2 signaling.

* * * * *